United States Patent
Feng et al.

(10) Patent No.: US 7,034,979 B1
(45) Date of Patent: Apr. 25, 2006

(54) VARIABLE OPTICAL ATTENUATOR USING CRYSTAL WEDGES

(75) Inventors: Wei Feng, Plano, TX (US); Chongchang Mao, Plano, TX (US); Tirun Lin, Plano, TX (US); Shuxin Li, Plano, TX (US); Minchun Li, Plano, TX (US); Ming Xu, Plano, TX (US); Tizhi Huang, Plano, TX (US)

(73) Assignee: EZConn Corporation, (TW)

( * ) Notice: Subject to any disclaimer, the term of this patent is extended or adjusted under 35 U.S.C. 154(b) by 475 days.

(21) Appl. No.: 10/290,857

(22) Filed: Nov. 8, 2002

Related U.S. Application Data

(60) Provisional application No. 60/332,324, filed on Nov. 9, 2001.

(51) Int. Cl.
*G02F 1/03* (2006.01)
(52) U.S. Cl. .................................... 359/246
(58) Field of Classification Search ............... 359/246, 359/484, 487, 488, 489, 494, 495, 497, 900; 385/11, 16, 17, 18, 24, 31, 33, 37
See application file for complete search history.

(56) References Cited

U.S. PATENT DOCUMENTS

| | | | | |
|---|---|---|---|---|
| 3,684,350 A | 8/1972 | Wentz | ....................... | 350/150 |
| 4,410,238 A | 10/1983 | Hanson | ....................... | 350/347 |
| 4,566,761 A | 1/1986 | Carlsen et al. | ............... | 350/401 |
| 4,685,773 A | 8/1987 | Carlsen et al. | ............... | 350/401 |
| 5,727,109 A | 3/1998 | Pan et al. | ..................... | 385/140 |
| 6,166,838 A * | 12/2000 | Liu et al. | ........................ | 398/1 |
| 6,721,078 B1 * | 4/2004 | Cao | ........................... | 359/246 |

OTHER PUBLICATIONS

Melman et al., "Wavelength-Division Multiplexer/Demultiplexer," Electronics Letters, 2 pages, May 23, 1985.
Senior et al., "Devices for wavelength multiplexing and demultiplexing," IEEE Proceedings, vol. 136, Pt. J., No. 3, 20 pages, Jun. 1989.

* cited by examiner

*Primary Examiner*—Hung Xuan Dang
*Assistant Examiner*—Tuyen Tra
(74) *Attorney, Agent, or Firm*—Baker Botts L.L.P.

(57) ABSTRACT

An optical device for processing an optical signal includes a crystal wedge, a polarization modulator, and a reflective element. The crystal wedge spatially separates an input optical signal into a first beam component having a first polarization state and a second beam component having a second polarization state. The crystal wedge has an optical axis arranged at an optical axis angle such that the first beam component and the second beam component converge. The polarization modulator changes the polarization state of the first beam component and the polarization state of the second beam component in response to a control signal. The reflective element reflects the first beam component and the second beam component such that the crystal wedge spatially recombines a portion of the first beam component having the second polarization state with a portion of the second beam component having the first polarization state to form an output optical signal.

26 Claims, 4 Drawing Sheets

VARIABLE OPTICAL ATTENUATOR USING CRYSTAL WEDGES

CROSS-REFERENCE TO RELATED APPLICATIONS

This application is related to and claims the benefit of U.S. Provisional Application No. 60/332,324, filed Nov. 9, 2001.

TECHNICAL FIELD OF THE INVENTION

The present invention relates generally to optical communication systems. More specifically, the present invention relates to a variable optical attenuator using crystal wedges.

BACKGROUND OF THE INVENTION

Optical power regulators are used in fiber optic networks to regulate the optical power levels of various optical signals. Optical power levels in an optical network can vary widely due to component malfunctions, network faults, or variations in the gain of optical amplifiers. Photoreceivers may not function properly if optical power levels become too great. When the optical power fluctuates, the optical power regulator adjusts its attenuation such that the output optical power level remains at an appropriate level.

SUMMARY OF THE INVENTION

In one embodiment of the present invention, an optical device for processing an optical signal includes a crystal wedge, a polarization modulator, and a reflective element. The crystal wedge spatially separates an input optical signal into a first beam component having a first polarization state and a second beam component having a second polarization state. The crystal wedge has an optical axis arranged at an optical axis angle such that the first beam component and the second beam component converge. The polarization modulator changes the polarization state of the first beam component and the polarization state of the second beam component in response to a control signal. The reflective element reflects the first beam component and the second beam component such that the crystal wedge spatially recombines a portion of the first beam component having the second polarization state with a portion of the second beam component having the first polarization state to form an output optical signal.

In another embodiment of the present invention, an optical device for processing an optical signal includes a first crystal wedge, a polarization modulator, and a second crystal wedge. The first crystal wedge spatially separates an input optical signal into a first beam component having a first polarization state and a second beam component having a second polarization state. The crystal wedge has an optical axis arranged at an optical axis angle such that the first beam component and the second beam component converge. The polarization modulator changes the polarization state of the first beam component and the polarization state of the second beam component in response to a control signal. The second crystal wedge spatially recombines a portion of the first beam component having the first polarization state with a portion of the second beam component having the second polarization state to form an output optical signal.

In yet another embodiment of the present invention, a method for processing an optical signal includes spatially separating an input optical signal into a first beam component having a first polarization state and a second beam component having a second polarization state. The method continues by propagating the first beam component along a first propagation path and propagating the second beam component along a second propagation path such that the first propagation path and the second propagation path converge. The method continues by changing the polarization state of the first beam component and the polarization state of the second beam component. The method concludes by spatially recombining a portion of the first beam component having the second polarization state with a portion of the second beam component having the first polarization state to form an output optical signal.

The following technical advantages may be achieved by some, none, or all of the embodiments of the present invention. The optical device performs a variable optical attenuation function to generate optical signals that have an appropriate power level. These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1A:
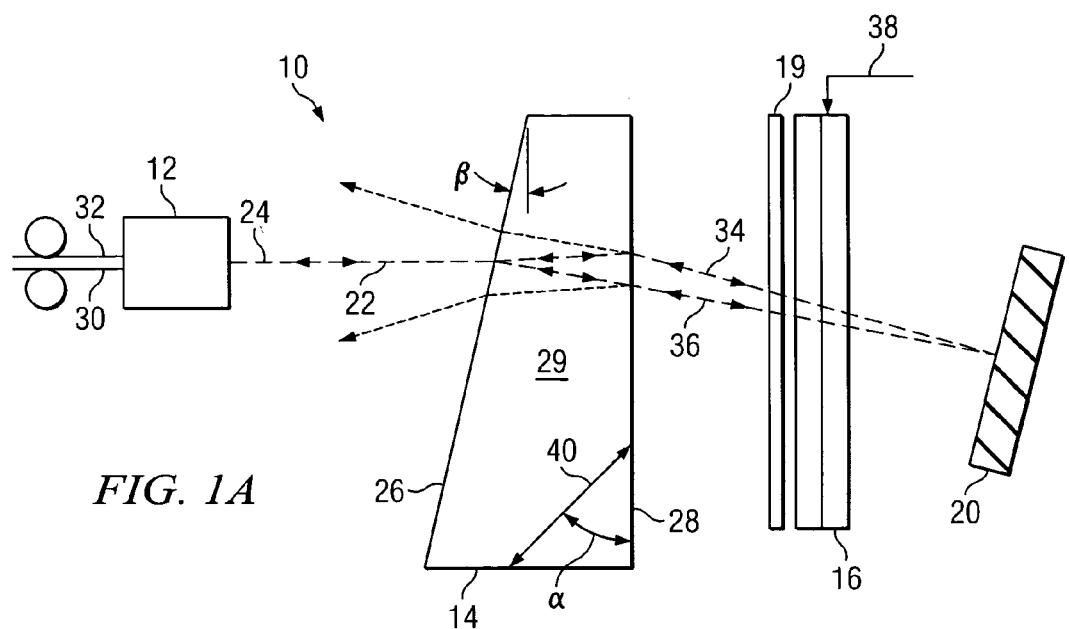
FIG. 1A illustrates a side view of one embodiment of an optical device according to the present invention.

FIG. 1A illustrates a side view of one embodiment of an optical device 10 that includes an input/output device 12, a birefringent element 14, a first polarization modulator 16, a compensation element 19, and a reflective element 20. In a particular embodiment, illustrated in FIG. 1B, device 10 further comprises a second polarization modulator 18. In general, optical device 10 variably attenuates the intensity of an input optical signal 22 to generate an output optical signal 24.

Input/output device 12 comprises a collimator having a first port coupled to a first fiber 30 used to communicate input signal 22, and a second port coupled to a second fiber 32 used to communicate output signal 24. In an alternative embodiment, device 12 may comprise a collimator and a circulator having ports coupled to fibers 30 and 32.

Figure 1B:
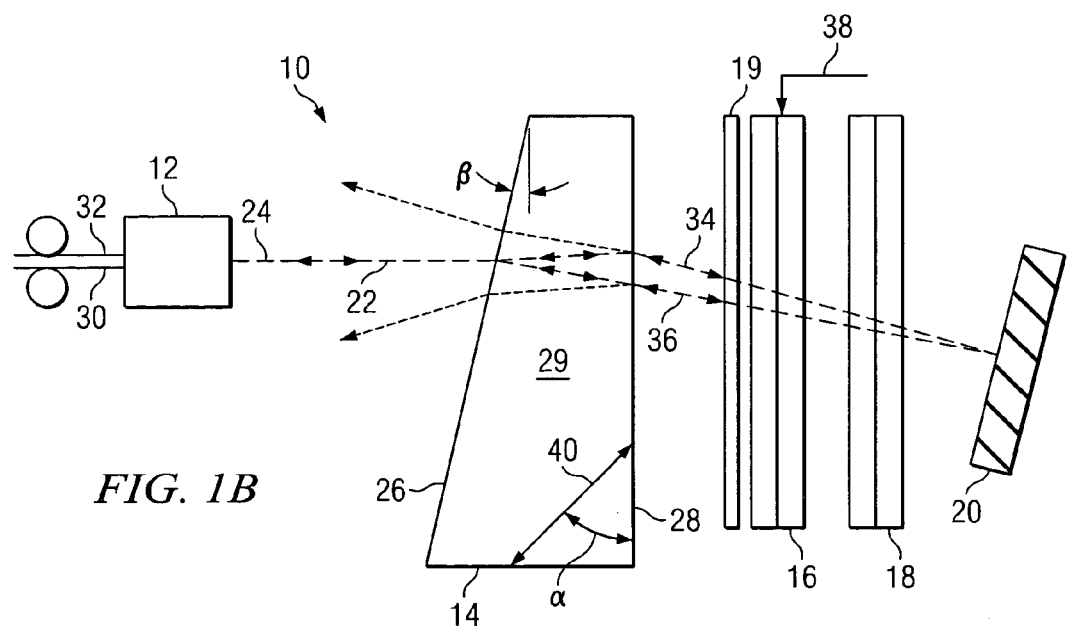
FIG. 1B illustrates a side view of another embodiment of the optical device.

Birefringent element 14 comprises a birefringent crystal that spatially separates input optical signal 22 into a first beam component 34 having a first polarization state (e.g., vertical polarization indicated by short lines) and a second beam component 36 having a second polarization state (e.g., horizontal polarization indicated by filled circles) that is orthogonal to the first polarization state, due to the birefringent walk-off effect of birefringent element 14. Examples of materials suitable for construction of the birefringent element 14 include calcite, rutile, lithium niobate, $YVO_4$, yttrium orthovandate-based crystals, and the like. Although birefringent crystals are used in one embodiment, a similar function can be achieved through the use of a polarization beamsplitter combined with a prism. In a particular embodiment, as illustrated in FIGS. 1A–1B, birefringent element 14 comprises a crystal wedge, referred to as crystal wedge 14, having an input surface 26, an output surface 28, and a side surface 29. In general, input surface 26 is arranged at a wedge angle, $\beta$. Crystal wedge 14 further comprises an optical axis 40 at an optical axis angle, $\alpha$. Optical axis 40 lies in a plane that is generally parallel with side surface 29. Crystal wedge 14 is described in greater detail with reference to FIG. 3.

Polarization modulator 16 comprises any suitable device operable to change a characteristic of the input optical signal 22 based upon an applied control signal 38, such as an applied voltage or current. As a particular example, modulator 16 may comprise a liquid crystal cell operable to change the polarization state of input signal 22. For example, liquid crystal polarization modulator 16 can change the polarization state of the first beam component 34 by a particular amount depending on control voltage 38, and can further change the polarization state of the second beam component 36 by a particular amount depending on control voltage 38.

Polarization modulator 18 comprises a $\lambda/4$ waveplate operable to change the polarization state of first beam component 34 and second beam component 36 by ninety degrees through a forward and a reflected propagation path. Alternatively, polarization modulator 18 may comprise a liquid crystal cell operable to change the polarization states of first beam component 34 and second beam component 36 in response to a control signal, as described above with regard to polarization modulator 16. It should be understood that the position of polarization modulators 16 and 18 may be exchanged without departing from the scope of the optical device 10. As described above, particular embodiments of device 10 may be constructed with polarization modulator 18. Other embodiments of device 10 may be constructed without polarization modulator 18. Therefore, the operation of device 10 is described below with and without polarization modulator 18.

Compensation element 19 comprises a $\lambda/4$ waveplate or any other suitable optical element that compensates for non-ideal phase residual effects and/or polarization effects of device 10. Non-idealities associated with modulators 16 and/or 18 may result in a non-zero value of phase retardation, which leads to phase residual effects, despite the value of the voltage or current applied by control signal 38. Rotating the optical axis of element 19 effectively changes the phase differences of beam components 34 and 36 having orthogonal polarizations. Therefore, by tuning the optical axis of element 19 the phase residual effects of device 10 may be compensated to a suitable degree. Moreover, the pseudo retro-reflective propagation paths of beam components 34 and 36 creates a "tilting effect" with respect to element 14. In other words, the orientation, of element 14 operating as an "input polarizer" is not orthogonal to the orientation of element 14 operating as an "output polarizer." This "tilting effect" leads to polarization effects that may cause light to be leaked out of the device 10. By tuning the optical axis of element 19, the polarization states of beam components 34 and 36 may be modified to compensate for the polarization effects and thereby maximize the performance of device 10.

Reflective element 20 comprises a mirror or any other suitable reflective material used to reflect beam components 34 and 36 along appropriate propagation paths back to crystal wedge 14. In a particular embodiment, as illustrated in FIGS. 1A–1B, crystal wedge 14 is arranged such that first beam component 34 intersects with second beam component 36 at or near reflective element 20.

In operation of device 10 without polarization modulator 18, as illustrated in FIG. 1A, crystal wedge 14 spatially separates input optical signal 22 into a first beam component 34 having a first polarization state and a second beam component 36 having a second polarization state that is orthogonal to the first polarization state. Polarization modulator 16 processes the polarization state of the first beam component 34 and the polarization state of the second beam component 36 in response to control signal 38. For example, the polarization state change caused by modulator 16 is dependent on the value of the voltage or current applied by control signal 38. After passing through polarization modulator 16 in a forward propagation path, reflective element 20 reflects beam components 34 and 36. Polarization modulator 16 processes the polarization states of beam components 34 and 36 propagating in their reflected propagation paths, in response to control signal 38. Crystal wedge 14 spatially recombines portions of beam components 34 and 36 depending upon their polarization states. Element 19 compensates for non-ideal phase residual effects and/or polarization effects of device 10. It should be understood that the propagation paths of beam components 34 and 36 may be altered slightly as a result of compensation element 19 and/or modulators 16 and/or 18.

If no voltage or current is applied by control signal 38, polarization modulator 16 processes each of the first and second beam components 34 and 36 in a forward propagation path and in a reflected propagation path such that the polarization state of the first beam component 34 comprises the second polarization state (e.g., horizontal polarization) and the polarization state of the second beam component 36 comprises the first polarization state (e.g., vertical polarization). In this regard, polarization modulator 16 changes the polarization states of beam components 34 and 36 by ninety degrees through the forward and reverse propagation paths. Crystal wedge 14 combines first beam component 34 with second beam component 36 to form output optical signal 24. In this regard, the intensity of output optical signal 24 substantially comprises the intensity of input optical signal 22 without attenuation. This is referred to as a "default on" operation. In other words, the default operation of device 10 with no control signal 38 applied is to communicate output optical signal 24 without attenuation.

As the value of the voltage or current applied by control signal 38 increases from zero, the polarization states of beam components 34 and 36 are changed such that a first portion of the first beam component 34 comprises the first polarization state and a second portion of the first beam component 34 comprises the second polarization state. Moreover, a first portion of the second beam component comprises the first polarization state and a second portion of the second beam component comprises the second polarization state. Crystal wedge 14 combines the portion of the first beam component 34 having the second polarization state with the portion of the second beam component 36 having the first polarization state to form output signal 24. Crystal wedge 14 discards the portion of the first beam component 34 having the first polarization state and the portion of the second beam component 36 having the second polarization state, as indicated by dashed arrows. In this regard, device 10 attenuates the intensity of output optical signal 24 by a particular degree determined in response to control signal 38.

As the value of the voltage or current applied by control signal 38 reaches a suitable threshold, the polarization states of beam components 34 and 36 are changed such that the polarization state of the first beam component 34 comprises the first polarization state and the polarization state of the second beam component 36 comprises the second polarization state. Crystal wedge 14 discards each of beam components 34 and 36, as indicated by dashed arrows, such that the intensity of output optical signal 24 is substantially zero. In this regard, device 10 completely attenuates signal 24 such that no light is received by input/output device 12.

In operation of device 10 with polarization modulator 18, as illustrated in FIG. 1B, if no control signal 38 is applied, polarization modulators 16 and 18 process each of the first and second beam components 34 and 36 in a forward propagation path and in a reflected propagation path such that the polarization state of the first beam component 34 comprises the first polarization state and the polarization state of the second beam component 36 comprises the second polarization state. Element 19 compensates for non-ideal phase residual effects and/or polarization effects of device 10. Crystal wedge 14 discards each of beam components 34 and 36, as indicated by dashed arrows, such that the intensity of output optical signal 24 is substantially zero. In this regard, device 10 completely attenuates signal 24 such that no light is received by input/output device 12. This is referred to as a "default off" operation. In other words, the default operation of device 10 with no control signal 38 applied is to completely attenuate optical signal 24.

As the value of the voltage or current applied by control signal 38 increases from zero, the polarization states of beam components 34 and 36 are changed such that a first portion of the first beam component 34 comprises the first polarization state and a second portion of the first beam component 34 comprises the second polarization state. Moreover, a first portion of the second beam component comprises the first polarization state and a second portion of the second beam component comprises the second polarization state. Crystal wedge 14 combines the portion of the first beam component 34 having the second polarization state with the portion of the second beam component 36 having the first polarization state to form output signal 24. Crystal wedge 14 discards the portion of the first beam component 34 having the first polarization state and the portion of the second beam component 36 having the second polarization state, as indicated by dashed arrows. In this regard, device 10 attenuates the intensity of output optical signal 24 by a particular degree determined in response to control signal 38.

As the value of the voltage or current applied by control signal 38 reaches a suitable threshold, the polarization states of beam components 34 and 36 are changed such that the polarization state of the first beam component 34 comprises the second polarization state and the polarization state of the second beam component 36 comprises the first polarization state. Crystal wedge 14 combines first beam component 34 with second beam component 36 to form output optical signal 24. In this regard, the intensity of output optical signal 24 substantially comprises the intensity of input optical signal 22 without attenuation.

Figure 2A:
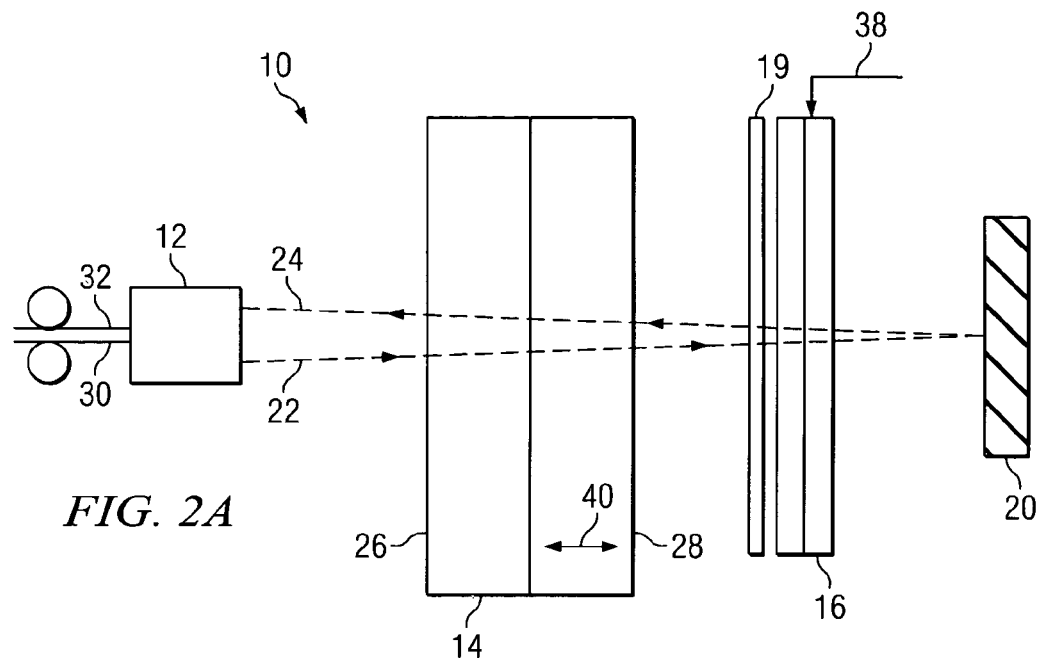
FIG. 2A illustrates a top view of the optical device of FIG. 1A.
Figure 2B:
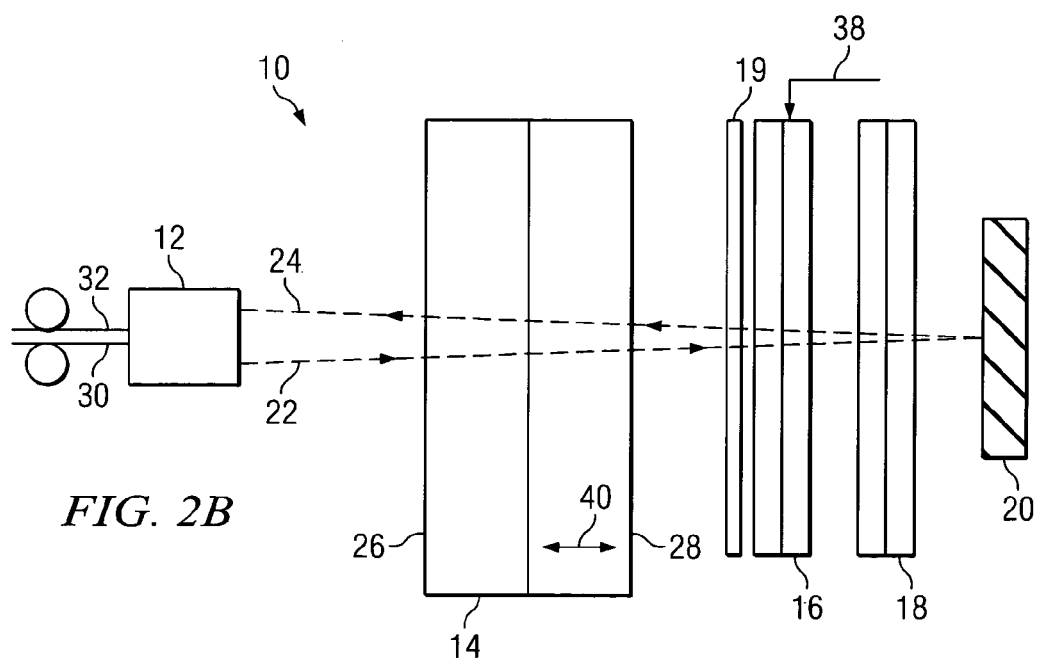
FIG. 2B illustrates a top view of the optical device of FIG. 1B.

FIGS. 2A and 2B illustrate top views of device 10 illustrated in FIGS. 1A and 1B, respectively. As described above, the characteristics of crystal wedge 14 are arranged in a particular embodiment such that first beam component 34 intersects with second beam component 36 at or near reflective element 20. Reflective element 20 reflects beam components 34 and 36 at appropriate angles such that input optical signal 22 and output optical signal 24 may be spatially separated at input/output device 12.

Figure 3:
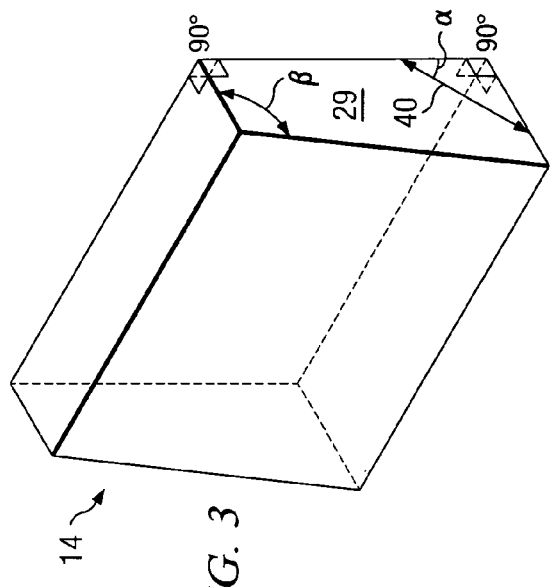
FIG. 3 illustrates one embodiment of a crystal wedge used in the optical device.

FIG. 3 illustrates one embodiment of crystal wedge 14 having an optical axis 40. As described above, optical axis 40 of crystal wedge 14 lies in a plane that is generally parallel to side surface 29. In a particular embodiment, optical axis 40 of crystal wedge 14 is in a plane that is generally parallel to the propagation paths of at least one of beam components 34 and 36. This property of crystal wedge 14 causes the first beam component 34 and the second beam component 36 to converge, as illustrated above with regard to FIGS. 1A–1B and as illustrated below with respect to FIGS. 4A–4B and 5. In a particular embodiment, beam components 34 and 36 ultimately intersect. However, beam components 34 and 36 may also come very close to intersecting without actually intersecting. Such an outcome does not depart from the contemplated operation of device 10. Wedge angle, $\beta$, and/or optical axis angle, $\alpha$, may be configured to control the point at which first beam component 34 intersects with second beam component 36.

Figure 4A:
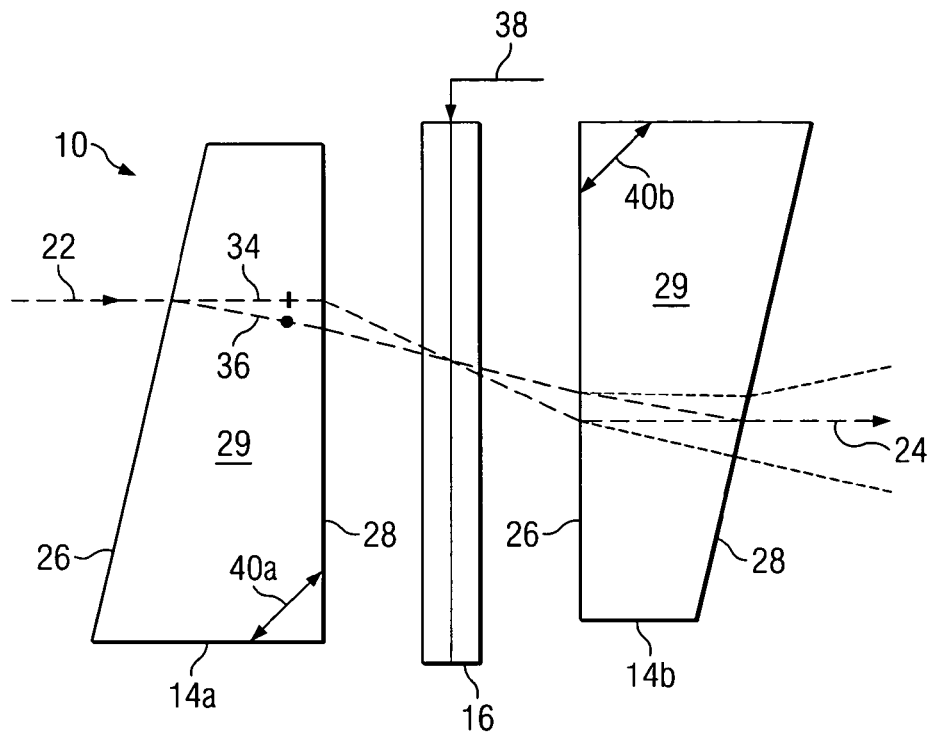
FIGS. 4A–4B illustrate side views of other embodiments of the optical device.

FIG. 4A illustrates another embodiment of device 10 that includes first crystal wedge 14a, polarization modulator 16, and second crystal wedge 14b. In a particular embodiment, illustrated in FIG. 4B, device 10 further comprises a second polarization modulator 18. In general, optical device 10 variably attenuates the intensity of input optical signal 22 to generate output optical signal 24.

Figure 4B:
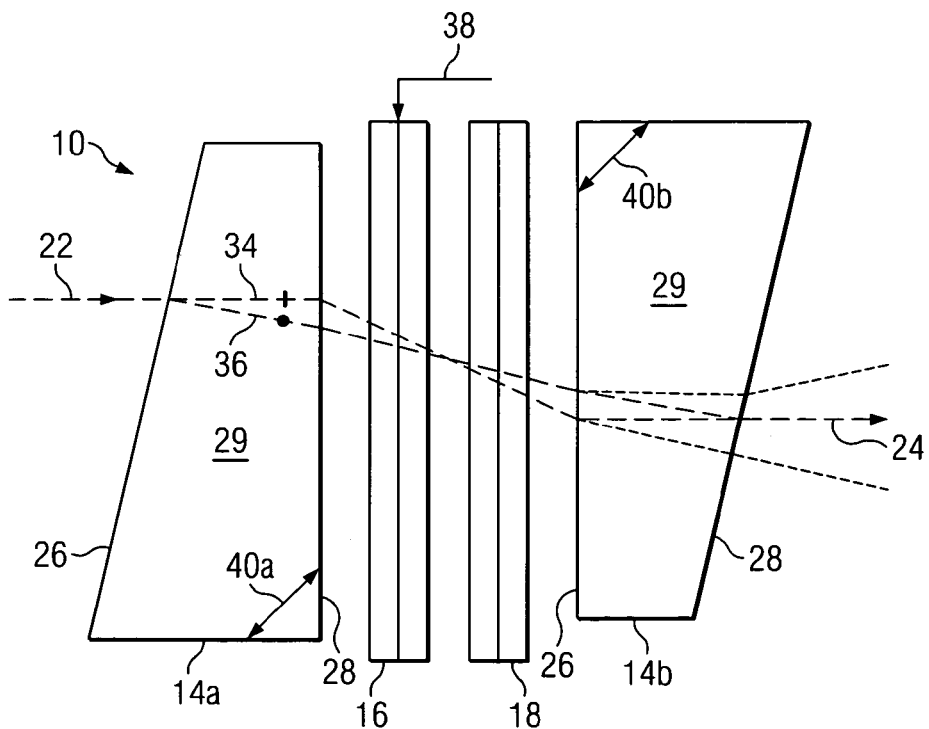

In each of the embodiments illustrated in FIGS. 4A and 4B, crystal wedges 14a and 14b may be arranged symmetrically about polarization modulator 16. In particular, second crystal wedge 14b is arranged rotated one-hundred-eighty degrees from first crystal wedge 14a about an axis that is perpendicular to side surface 29. In this regard, input surface 26 of second crystal wedge 14b is parallel to the output surface 28 of first crystal wedge 14a, and the output surface 28 of second crystal wedge 14b is parallel to the input surface 26 of first crystal wedge 14a. First crystal wedge 14a is arranged such that first beam component 34 intersects with second beam component 36 at a point that is between first crystal wedge 14a and second crystal wedge 14b. In a particular embodiment, first beam component 34 intersects with second beam component 36 at a point that is equidistant from the output surface 28 of first crystal wedge 14a and input surface 26 of second crystal wedge 14b. The wedge angle, $\beta$, and the optical axis angle, $\alpha$, of second crystal wedge 14b is arranged to receive beam components 34 and 36 and process them to form output signal 24. In one embodiment, the wedge angle, $\beta$, and the optical axis angle, $\alpha$, of second crystal wedge 14b is based at least in part upon the wedge angle, $\beta$, and the optical axis angle, $\alpha$, of first crystal wedge 14a.

In operation of device 10 without polarization modulator 18, as illustrated in FIG. 4A, crystal wedge 14a spatially separates input optical signal 22 into a first beam component 34 having a first polarization state and a second beam component 36 having a second polarization state that is orthogonal to the first polarization state. Polarization modulator 16 processes the polarization state of the first beam component 34 and the polarization state of the second beam component 36 in response to control signal 38. For example, the polarization state change caused by modulator 16 is dependent on the value of the voltage or current applied by control signal 38. Crystal wedge 14b spatially recombines portions of beam components 34 and 36 depending upon their polarization states. It should be understood that the propagation paths of beam components 34 and 36 may be altered slightly as a result of modulators 16 and/or 18.

If no control signal 38 is applied, polarization modulator 16 processes each of the first and second beam components 34 and 36 such that the polarization state of the first beam component 34 comprises the second polarization state (e.g., horizontal polarization) and the polarization state of the second beam component 36 comprises the first polarization state (e.g., vertical polarization). In this regard, polarization modulator 16 changes the polarization states of beam components 34 and 36 by ninety degrees. Crystal wedge 14b discards each of beam components 34 and 36, as indicated by dashed arrows, such that the intensity of output optical signal 24 is substantially zero. In this regard, device 10 completely attenuates signal 24. This is referred to as a "default off" operation. In other words, the default operation of device 10 with no control signal 38 applied is to completely attenuate optical signal 24.

As the value of the voltage or current applied by control signal 38 increases from zero, the polarization states of beam components 34 and 36 are changed such that a first portion of the first beam component 34 comprises the first polarization state and a second portion of the first beam component 34 comprises the second polarization state. Moreover, a first portion of the second beam component comprises the first polarization state and a second portion of the second beam component comprises the second polarization state. Crystal wedge 14b combines the portion of the first beam component 34 having the first polarization state with the portion of the second beam component 36 having the second polarization state to form output signal 24. Crystal wedge 14b discards the portion of the first beam component 34 having the second polarization state and the portion of the second beam component 36 having the first polarization state, as indicated by dashed arrows. In this regard, device 10 attenuates the intensity of output optical signal 24 by a particular degree determined in response to the voltage applied by control signal 38.

As the voltage applied by control signal 38 reaches a suitable threshold, the polarization states of beam components 34 and 36 are changed such that the polarization state of the first beam component 34 comprises the first polarization state and the polarization state of the second beam component 36 comprises the second polarization state. Crystal wedge 14 combines first beam component 34 with second beam component 36 to form output optical signal 24. In this regard, the intensity of output optical signal 24 substantially comprises the intensity of input optical signal 22 without attenuation.

In operation of device 10 with polarization modulator 18, as illustrated in FIG. 4B, if no control signal 38 is applied, polarization modulators 16 and 18 process each of the first and second beam components 34 and 36 such that the polarization state of the first beam component 34 comprises the first polarization state and the polarization state of the second beam component 36 comprises the second polarization state. Crystal wedge 14b combines first beam component 34 with second beam component 36 to form output optical signal 24. In this regard, the intensity of output optical signal 24 substantially comprises the intensity of input optical signal 22 without attenuation. This is referred to as a "default on" operation. In other words, the default operation of device 10 with no control signal 38 applied is to communicate output optical signal 24 without attenuation.

As the value of the voltage or current applied by control signal 38 increases from zero, the polarization states of beam components 34 and 36 are changed such that a first portion of the first beam component 34 comprises the first polarization state and a second portion of the first beam component 34 comprises the second polarization state. Moreover, a first portion of the second beam component comprises the first polarization state and a second portion of the second beam component comprises the second polarization state. Crystal wedge 14b combines the portion of the first beam component 34 having the first polarization state with the portion of the second beam component 36 having the second polarization state to form output signal 24. Crystal wedge 14b discards the portion of the first beam component 34 having the second polarization state and the portion of the second beam component 36 having the first polarization state, as indicated by dashed arrows. In this regard, device 10 attenuates the intensity of output optical signal 24 by a particular degree determined in response to the voltage applied by control signal 38.

As the value of the voltage or current applied by control signal 38 reaches a suitable threshold, the polarization states of beam components 34 and 36 are changed such that the polarization state of the first beam component 34 comprises the second polarization state and the polarization state of the second beam component 36 comprises the first polarization state. Crystal wedge 14b discards each of beam components 34 and 36, as indicated by dashed arrows, such that the intensity of output optical signal 24 is substantially zero. In this regard, device 10 completely attenuates signal 24.

Figure 5:
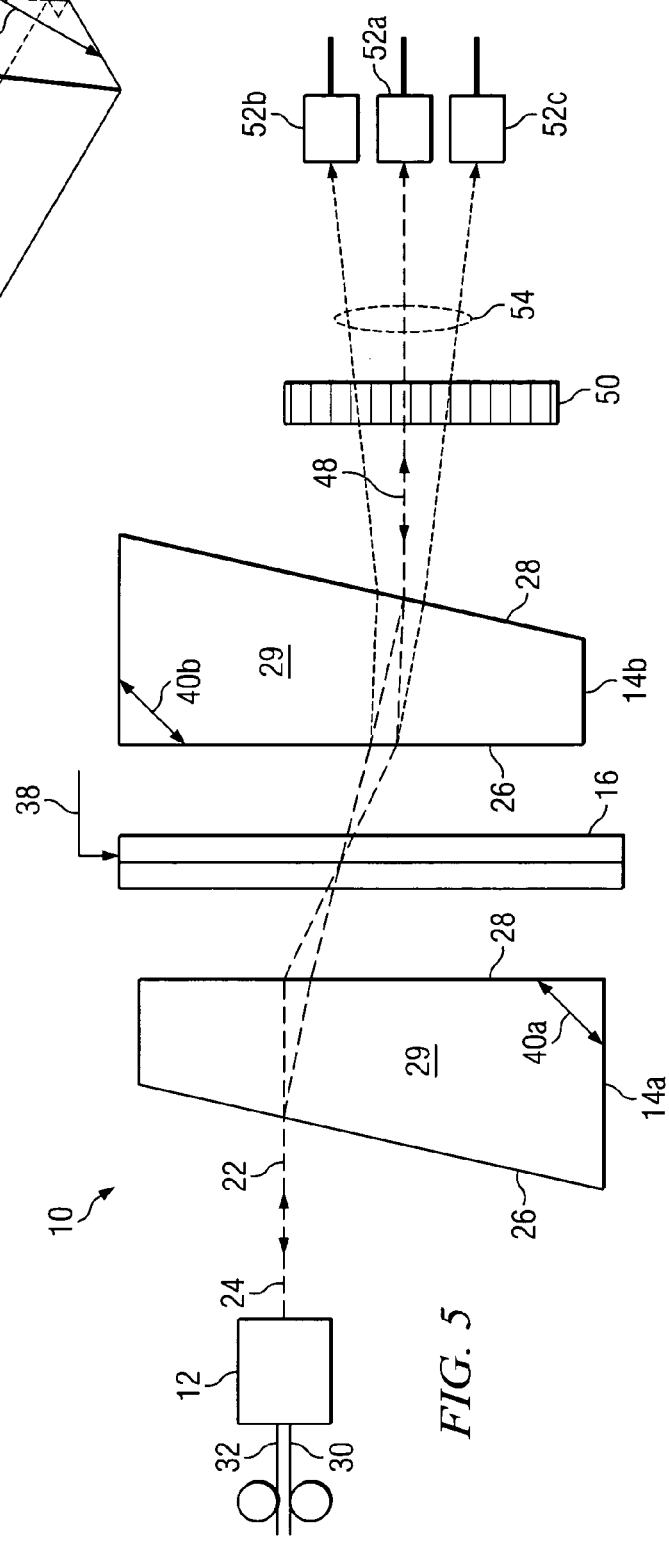
FIG. 5 illustrates a side view of another embodiment of the optical device.

FIG. 5 illustrates another embodiment of device 10 that includes first crystal wedge 14a, polarization modulator 16, second crystal wedge 14b, partially reflective element 50 and detectors 52a–c. In general, crystal wedge 14a, polarization modulator 16, and second crystal wedge 14b operate as described above with regard to FIG. 4A. However, partially reflective element 50 reflects a substantial portion of an intermediate optical signal 48 back through wedges 14a–b and polarization modulator 16 to form output optical signal 24. This may result in further attenuation depending upon the operation of polarization modulator 16. Therefore, device 10 illustrated in FIG. 5 operates like two attenuators in series. Partially reflective element 50 transmits a portion of the intermediate optical signal 48 for communication to detector 52a. Partially reflective element 50 also transmits a portion of any discarded beam components 34 and 36 for communication to detectors 52b and 52c, as indicated by dashed arrows. A lens 54 may be used to spatially separate discarded beam components 34 and 36 from each other and from intermediate optical signal 48 as they propagate from partially reflective element 50 to detectors 52a–c. Detectors 52a–c comprise any suitable photodetectors that can measure the intensity of light signals. In this regard, device 10 may monitor the power of various optical signals. It should be understood that device 10 using partially reflective element 50 and detectors 52a–c may also be used in a configuration that includes polarization modulator 18, as described above with regard to FIG. 4B.

The above disclosure sets forth a number of embodiments of the present invention. Other arrangements or embodiments, not precisely set forth, could be practiced under the teachings of the present invention and as set forth in the following claims.

What is claimed is:

1. An optical device for processing an optical signal, comprising:
   a crystal wedge operable to spatially separate an input optical signal into a first beam component having a first polarization state and a second beam component having a second polarization state, the crystal wedge having an optical axis arranged at an optical axis angle such that the first beam component and the second beam component converge;

a polarization modulator operable to change the polarization state of the first beam component and the polarization state of the second beam component in response to a control signal; and a reflective element operable to reflect the first beam component and the second beam component such that the crystal wedge spatially recombines a portion of the first beam component having the second polarization state with a portion of the second beam component having the first polarization state to form an output optical signal.

2. The optical device of claim 1, wherein the first beam component intersects with the second beam component at the reflective element.

3. The optical device of claim 1, wherein the crystal wedge comprises a wedge angle and the first beam component intersects with the second beam component at a distance from the crystal wedge based at least in part upon at least one of the optical axis angle and the wedge angle.

4. The optical device of claim 1, wherein the crystal wedge comprises an input surface, an output surface, and a side surface, and the optical axis of the crystal wedge is in a plane that is parallel to the side surface.

5. The optical device of claim 1, wherein the polarization modulator processes the first and second beam components in a forward propagation path and in a reflected propagation path such that the polarization state of the first beam component comprises the second polarization state and the polarization state of the second beam component comprises the first polarization state.

6. The optical device of claim 5, wherein the value of the control signal is substantially zero.

7. The optical device of claim 1, wherein the polarization modulator comprises a first polarization modulator and further comprising a second polarization modulator operable to change the polarization state of the first beam component and the polarization state of the second beam component.

8. The optical device of claim 7, wherein the second polarization modulator comprises one of a liquid crystal cell and a quarter-wave plate.

9. The optical device of claim 7, wherein the first polarization modulator and the second polarization modulator combine to process the first beam component and the second beam component in a forward propagation path and a reflected propagation path such that the polarization state of the first beam component comprises the first polarization state and the polarization state of the second beam component comprises the second polarization state.

10. The optical device of claim 9, wherein the value of the control signal is substantially zero.

11. The optical device of claim 7, wherein the first polarization modulator and the second polarization modulator combine to process the first beam component and the second beam component in a forward propagation path and a reflected propagation path such that a first portion of the first beam component comprises the first polarization state and a second portion of the first beam component comprises the second polarization state, and such that a first portion of the second beam component comprises the first polarization state and a second portion of the second beam component comprises the second polarization state.

12. The optical device of claim 1, wherein the polarization modulator comprises a liquid crystal cell.

13. The optical device of claim 1, further comprising a compensation element arranged between the crystal wedge and the reflective element and operable to compensate at least one of a phase residual effect and a polarization effect.

14. A method for processing an optical signal, comprising:

spatially separating an input optical signal into a first beam component having a first polarization state and a second beam component having a second polarization state;

propagating the first beam component along a first propagation path;

propagating the second beam component along a second propagation path such that the first propagation path and the second propagation path converge;

changing the polarization state of the first beam component and the polarization state of the second beam component; and spatially recombining a portion of the first beam component having the second polarization state with a portion of the second beam component having the first polarization state to form an output optical signal.

15. The method of claim 14, further comprising reflecting the first beam component and the second beam component prior to spatially recombining a portion of the first beam component and a portion of the second beam component.

16. The method of claim 14, wherein changing the polarization state comprises processing the first and second beam components such that the polarization state of the first beam component comprises the second polarization state and the polarization state of the second beam component comprises the first polarization state.

17. The method of claim 16, wherein processing the first and second beam components comprises processing the first and second beam components in a forward propagation path and in a reverse propagation path.

18. The method of claim 16, wherein processing the first and second beam components comprises processing the first and second beam components using a first polarization modulator and a second polarization modulator.

19. The method of claim 14, wherein changing the polarization state comprises processing the first and second beam components such that the polarization state of the first beam component comprises the first polarization state and the polarization state of the second beam component comprises the second polarization state.

20. The method of claim 19, wherein processing the first and second beam components comprises processing the first and second beam components in a forward propagation path and in a reverse propagation path.

21. The method of claim 19, wherein processing the first and second beam components comprises processing the first and second beam components using a first polarization modulator and a second polarization modulator.

22. The method of claim 14, wherein changing the polarization state comprises processing the first and second beam components such that a first portion of the first beam component composes the first polarization state and a second portion of the first beam component comprises the second polarization state, and such that a first portion of the second beam component comprises the first polarization state and a second portion of the second beam component comprises the second polarization state.

23. The method of claim 22, wherein processing the first and second beam components comprises processing the first and second beam components in a forward propagation path and in a reverse propagation path.

24. The method of claim 22, wherein processing the first and second beam components comprises processing the first and second beam components using a first polarization modulator and a second polarization modulator.

25. The method of claim 14, wherein the second beam component intersects with the first beam component prior to spatially recombining a portion of the first beam component and a portion of the second beam component.

26. The method of claim 14, further comprising compensating at least one of a phase residual effect and a polarization effect.

* * * * *